United States Patent
Nachenberg et al.

(10) Patent No.: US 7,861,304 B1
(45) Date of Patent: Dec. 28, 2010

(54) PATTERN MATCHING USING EMBEDDED FUNCTIONS

(75) Inventors: Carey Nachenberg, Northridge, CA (US); Alex Weinstein, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1774 days.

(21) Appl. No.: 10/841,376

(22) Filed: May 7, 2004

(51) Int. Cl.
*G06F 11/00* (2006.01)

(52) U.S. Cl. .......................... 726/24; 713/188

(58) Field of Classification Search ............ 726/22–25, 726/11–13; 713/151, 152, 187–189, 193, 713/154; 380/1; 717/124–161; 706/48; 712/300; 707/6, 705, 687–704, 758, 797, 707/803, 809, 922
See application file for complete search history.

(56) References Cited

U.S. PATENT DOCUMENTS

| | | | |
|---|---|---|---|
| 5,398,196 A | | 3/1995 | Chambers |
| 5,452,442 A | * | 9/1995 | Kephart .................. 714/38 |
| 5,495,607 A | | 2/1996 | Pisello et al. |
| 5,524,250 A | * | 6/1996 | Chesson et al. ............. 712/228 |
| 5,572,590 A | | 11/1996 | Chess |
| 5,675,710 A | | 10/1997 | Lewis |
| 5,694,569 A | | 12/1997 | Fischer |
| 5,826,249 A | | 10/1998 | Skeirik |
| 5,832,208 A | | 11/1998 | Chen et al. |
| 5,832,527 A | | 11/1998 | Kawaguchi |
| 5,854,916 A | | 12/1998 | Nachenberg |
| 5,884,033 A | | 3/1999 | Duvall et al. |
| 5,944,821 A | | 8/1999 | Angelo |
| 5,974,549 A | | 10/1999 | Golan |
| 5,978,801 A | * | 11/1999 | Yuasa ...................... 707/6 |
| 6,006,242 A | | 12/1999 | Poole et al. |
| 6,016,546 A | * | 1/2000 | Kephart et al. ............ 726/24 |
| 6,021,510 A | | 2/2000 | Nachenberg |
| 6,023,723 A | | 2/2000 | McCormick et al. |
| 6,052,709 A | | 4/2000 | Paul |
| 6,072,942 A | | 6/2000 | Stockwell et al. |
| 6,088,803 A | | 7/2000 | Tso et al. |
| 6,091,407 A | * | 7/2000 | Boetje et al. ............. 715/721 |
| 6,092,194 A | | 7/2000 | Touboul |
| 6,094,731 A | | 7/2000 | Waldin et al. |

(Continued)

FOREIGN PATENT DOCUMENTS

EP 0636977 A2 2/1995

(Continued)

OTHER PUBLICATIONS

Burchell, Jonathan, "NetShield 1.5", Virus Bulletin, Aug. 1994, pp. 21-23, XP 000617453.

(Continued)

*Primary Examiner*—Nirav Patel
(74) *Attorney, Agent, or Firm*—Fenwick & West LLP

(57) ABSTRACT

Methods, apparati, and computer-readable media for matching patterns of symbols within computer systems. A method embodiment of the present invention comprises composing (11) a pattern matching expression; and embedding (12) a function using storage means within the expression to form a character matching string. The expression may be a regular expression. The character matching string is compared (13) against a target string. The target string may be one that is suspected to contain malicious computer code.

19 Claims, 2 Drawing Sheets

U.S. PATENT DOCUMENTS

| | | | |
|---|---|---|---|
| 6,125,459 A | 9/2000 | Andoh et al. | |
| 6,161,130 A | 12/2000 | Horvitz et al. | |
| 6,167,434 A | 12/2000 | Pang | |
| 6,169,999 B1* | 1/2001 | Kanno | 715/255 |
| 6,253,169 B1 | 6/2001 | Apte et al. | |
| 6,298,351 B1 | 10/2001 | Castelli et al. | |
| 6,347,310 B1 | 2/2002 | Passera | |
| 6,370,526 B1 | 4/2002 | Agrawal et al. | |
| 6,397,200 B1 | 5/2002 | Lynch et al. | |
| 6,397,215 B1 | 5/2002 | Kreulen et al. | |
| 6,401,122 B1 | 6/2002 | Matsui et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,546,416 B1 | 4/2003 | Kirsch | |
| 6,721,721 B1 | 4/2004 | Bates et al. | |
| 6,751,789 B1 | 6/2004 | Berry et al. | |
| 6,772,346 B1 | 8/2004 | Chess et al. | |
| 6,785,677 B1* | 8/2004 | Fritchman | 707/6 |
| 6,842,861 B1 | 1/2005 | Cox et al. | |
| 6,886,099 B1 | 4/2005 | Smithson et al. | |
| 6,944,555 B2 | 9/2005 | Blackett et al. | |
| 6,952,779 B1 | 10/2005 | Cohen et al. | |
| 6,973,578 B1 | 12/2005 | McIchionc | |
| 6,990,442 B1* | 1/2006 | Davis | 704/9 |
| 7,024,403 B2 | 4/2006 | Kyler | |
| 7,069,501 B2* | 6/2006 | Kunitake et al. | 715/234 |
| 7,093,231 B2* | 8/2006 | Nuss | 717/114 |
| 7,225,188 B1* | 5/2007 | Gai et al. | 707/6 |
| 7,248,682 B1* | 7/2007 | Oran | 370/352 |
| 2002/0035693 A1 | 3/2002 | Eyres et al. | |
| 2002/0038308 A1 | 3/2002 | Cappi | |
| 2002/0046207 A1 | 4/2002 | Chino et al. | |
| 2002/0073046 A1 | 6/2002 | David | |
| 2002/0087649 A1 | 7/2002 | Horvitz | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0178375 A1 | 11/2002 | Whittaker et al. | |
| 2002/0194488 A1 | 12/2002 | Cormack et al. | |
| 2002/0194489 A1 | 12/2002 | Almogy et al. | |
| 2002/0199186 A1 | 12/2002 | Ali et al. | |
| 2002/0199194 A1 | 12/2002 | Ali | |
| 2003/0023875 A1 | 1/2003 | Hursey et al. | |
| 2003/0033536 A1* | 2/2003 | Pak | 713/188 |
| 2003/0033587 A1 | 2/2003 | Ferguson et al. | |
| 2003/0061287 A1 | 3/2003 | Yu et al. | |
| 2003/0065926 A1* | 4/2003 | Schultz et al. | 713/188 |
| 2003/0110280 A1 | 6/2003 | Hinchliffe et al. | |
| 2003/0110393 A1* | 6/2003 | Brock et al. | 713/200 |
| 2003/0110395 A1 | 6/2003 | Presotto et al. | |
| 2003/0115458 A1 | 6/2003 | Song | |
| 2003/0115479 A1 | 6/2003 | Edwards et al. | |
| 2003/0154394 A1 | 8/2003 | Levin | |
| 2003/0167402 A1 | 9/2003 | Stolfo et al. | |
| 2003/0191847 A1* | 10/2003 | Vion-Dury et al. | 709/229 |
| 2003/0233352 A1 | 12/2003 | Baker | |
| 2004/0015554 A1 | 1/2004 | Wilson | |
| 2004/0039921 A1 | 2/2004 | Chuang | |
| 2004/0103310 A1 | 5/2004 | Sobel et al. | |
| 2004/0110118 A1* | 6/2004 | Clark et al. | 434/350 |
| 2004/0117401 A1 | 6/2004 | Miyata et al. | |
| 2004/0117641 A1 | 6/2004 | Kennedy et al. | |
| 2004/0220975 A1 | 11/2004 | Carpentier et al. | |
| 2005/0102601 A1* | 5/2005 | Wells | 714/758 |
| 2005/0114700 A1* | 5/2005 | Barrie et al. | 713/201 |

FOREIGN PATENT DOCUMENTS

| | | |
|---|---|---|
| EP | 1408393 A2 | 4/2004 |
| WO | WO 93/25024 A1 | 12/1993 |
| WO | WO 99/15966 A1 | 4/1999 |
| WO | WO 00/28420 A2 | 5/2000 |
| WO | WO 02/33525 A2 | 4/2002 |

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <URL: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Protection Strategy" [online] Trend Micro Inc. [retrieved Dec. 3, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Choi, Yang-Seo, et al., "A New Stack Buffer Overflow Hacking Defense Technique with Memory Address Confirmation", Lecture Notes in Computer Science 2288, 2002, pp. 146-159, Spinger Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>.

Bontchev, Vesselin, "Possible Macro Virus Attacks and How to Prevent Them", Computer & Security, vol. 15, No. 7, pp. 595-626, 1996.

Nachenberg, C., "Virus-AntiVirus Co-evolution," Symantec Research Labs, Presentation given at University of California Los Angeles, Computer Science 201 (graduate level seminar), 1997, Los Angeles, CA, USA.

Nachenberg, C., "A New Technique for Detecting Polymorphic Computer Viruses," University of California Los Angeles, thesis, 1995, 127 pages, Los Angeles, CA, USA.

* cited by examiner

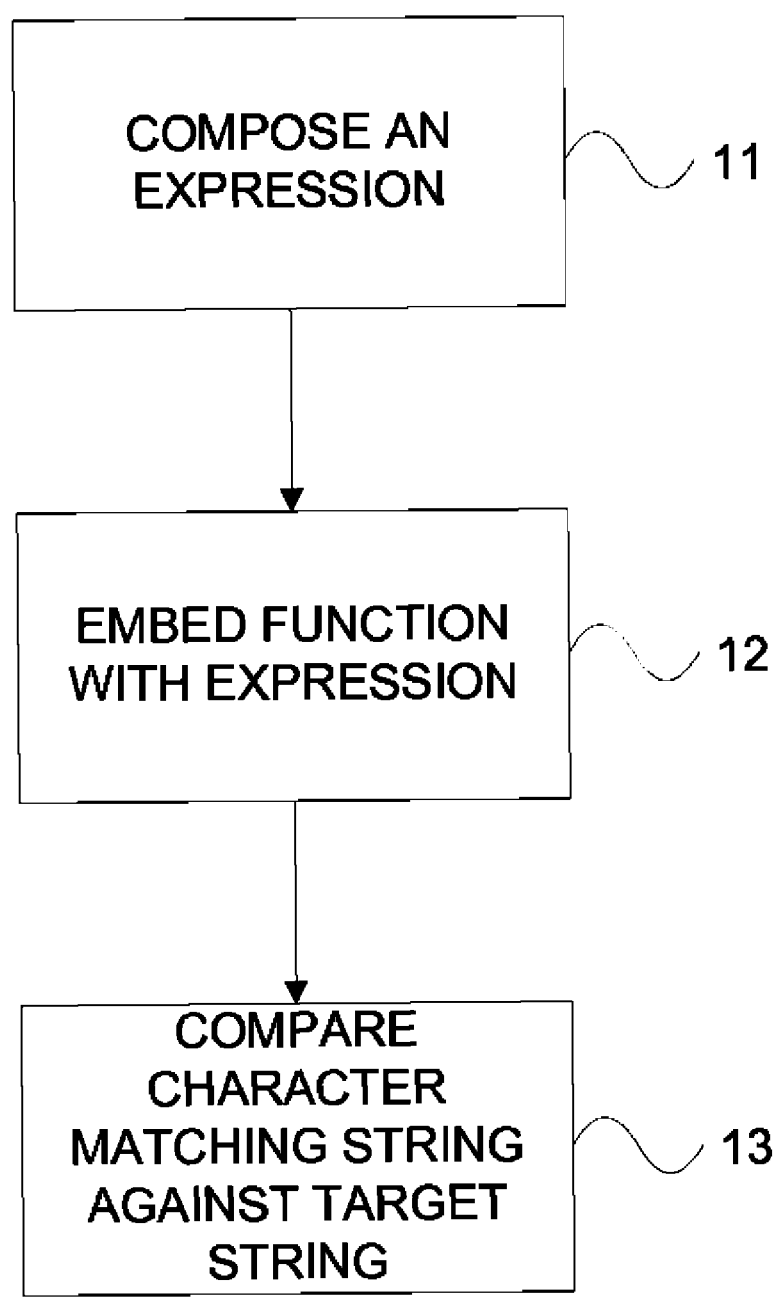

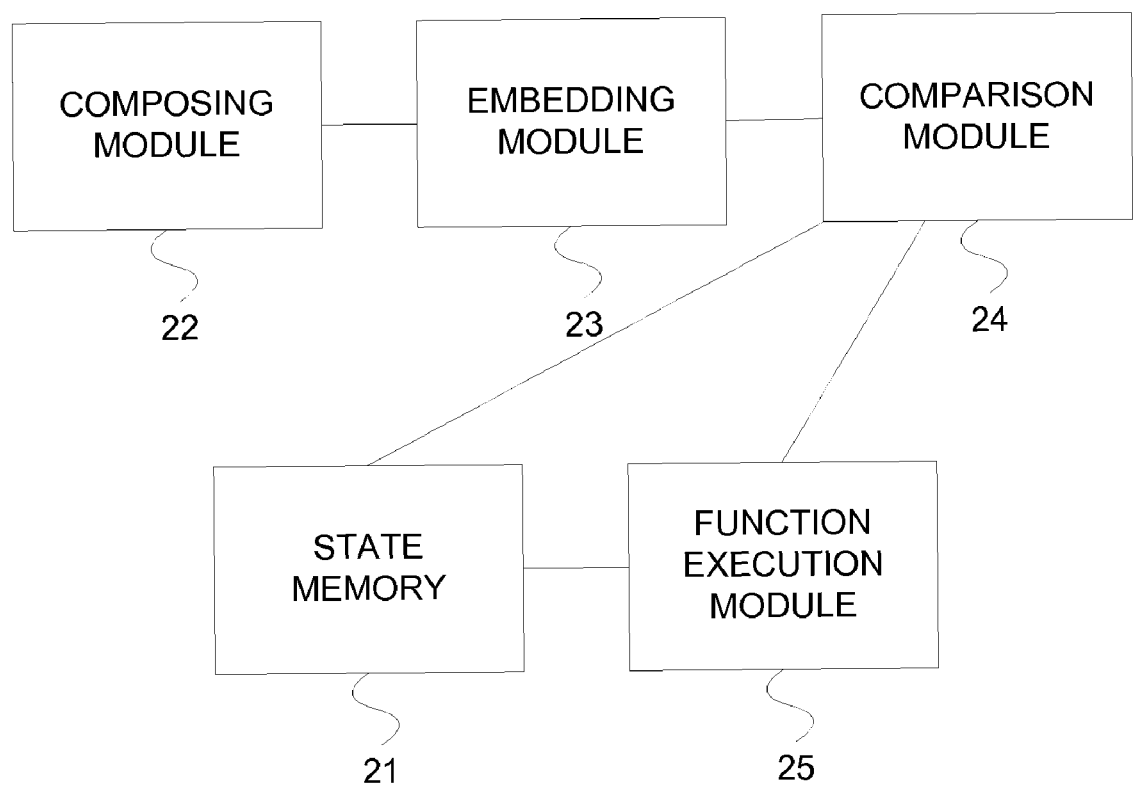

PATTERN MATCHING USING EMBEDDED FUNCTIONS

TECHNICAL FIELD

This invention pertains to the field of matching strings of symbols within computer systems. The invention has applicability to many fields, including intrusion detection and scanning for malicious computer code such as viruses.

BACKGROUND ART

As used herein, "malicious computer code" is any code that enters a computer without an authorized user's knowledge and/or without an authorized user's consent. Malicious computer code that propagates from one computer to another over a network, e.g., via e-mail, is often referred to as a "worm". Other types of malicious computer code include viruses, Trojan horses, spam, adware, and intruding attack code.

One of the techniques for detecting malicious computer code is to look for alphanumeric characters or other symbols that are characteristic of the malicious code. Such a technique is referred to as pattern matching, string matching, or signature matching.

Nachenberg, Carey, "A New Technique For Detecting Polymorphic Computer Viruses", a thesis submitted in partial satisfaction of the requirements for the degree of Master of Science in Computer Science and Engineering, University of California Los Angeles (UCLA), 1995, shows the use of inline functions within a virus signature. Nachenberg, Carey, "Virus-AntiVirus Co-evolution", hard copy of a presentation given at UCLA Computer Science 201 (graduate level seminar), 1997, shows other techniques for combating computer viruses.

DISCLOSURE OF INVENTION

The present invention comprises methods, apparati, and computer-readable media for matching patterns of symbols within computer systems. A method embodiment of the present invention comprises composing (11) a pattern matching expression; and embedding (12) a function using storage means within the expression to form a character matching string. The expression may be a regular expression. The character matching string is compared (13) against a target string. The target string may be one that is suspected to contain malicious computer code.

BRIEF DESCRIPTION OF THE DRAWINGS

These and other more detailed and specific objects and features of the present invention are more fully disclosed in the following specification, reference being had to the accompanying drawings, in which:

FIG. 1 is a flow diagram illustrating a method embodiment of the present invention.

FIG. 2 is a system level diagram showing apparatus suitable for use in carrying out the present invention.

DETAILED DESCRIPTION OF THE PREFERRED EMBODIMENTS

As used throughout the following specification including claims, the following terms have the following meanings:

"Computer system" is any type of individual computing device, such as a desktop computer, a laptop computer, a PDA (personal digital assistant), etc.; or any group of computing devices networked or coupled together.

"Function" is any operation or procedure performed by a computer.

"String" is used in the general sense to mean any sequence of characters or symbols that can be represented in computer-readable form.

"Regular expression" is one example of an expression that can be matched by a deterministic finite state automaton. A regular expression is a well-known system for specifying matching information.

"Finite state automaton" is an engine that starts operations from an initial state or set of states, and then sequentially processes an incoming stream of symbols. As each incoming symbol is processed, the automaton undergoes a change of state or states, depending upon the previous state or states of the automaton and upon the identity of the incoming symbol.

"Deterministic finite state automaton" is a finite state automaton in which the automaton has a single current state at each point in time. The current state is completely determined by the predecessor state and by the input symbol.

"Push-Down Automaton" (PDA) is a state machine that has the ability to push something onto a stack or to pop something off of a stack.

"Expression" is an instance that is taken out of a computer language.

"Pattern matching expression" is any string that can be matched (compared) against another string. Some pattern matching expressions can be represented by deterministic finite state automata and/or by push-down automata.

"Coupled" means any form of direct or indirect coupling or communicative link.

"Little-Endian computer" is a computer in which the lowest ordered byte in an expression is stored in the lowest ordered storage register. Microprocessors made by Intel are Little-Endian.

"Big-Endian computer" is a computer in which the highest ordered byte in an expression is stored in the lowest ordered storage register. Microprocessors made by Motorola are Big-Endian.

"P-CODE" is a machine-independent form of executable instructions. It is a subclass of byte code.

With reference to FIG. 1, a method embodiment of the present invention comprises composing 11 a pattern matching expression, and embedding 12 a function within the expression to form a character matching string. When the expression is a regular expression or another expression that can be represented by a deterministic finite state automaton or a push-down automaton, the function can be one that expands the pattern matching expression into an expression that cannot be represented by a deterministic finite state automaton or a push-down automaton, respectively. For the general case where the expression is a pattern matching expression but not necessarily a deterministic finite state automaton or a push-down automaton, the function can be a function using storage means, a function that matches without sensitivity to case, or a function that matches despite the presence of alternate encoding. ASCII is considered to be conventional encoding. "Alternate" encoding includes unicode, double unicode, EBCDIC (Extended Binary Coded Decimal Interchange Code), and BCD (Binary Coded Decimal). For functions using storage means, the storage means can be any storage device, such as a register, a variable, computer memory, or any computer-readable medium. The expression can be a regular expression.

In step 13, the character matching string is compared against a target string within the computer system. The present invention can be used for any type of data classification or data characterization, such as detecting an intrusion to a computer system or detecting a virus. Another application is to analyze a log file to detect when a computer printer is about to run out of paper.

The target string may be a string that is suspected to contain malicious computer code. In this embodiment, when a match is observed between the character matching string and the target string, a suspicion of malicious computer code is declared and is usually conveyed to the system administrator. This tentative conclusion can be verified by subjecting the target string to a false positive mitigation procedure, such as subjecting the target string to antivirus scanning software or behavior blocking software; or sending the target string in an encrypted forth to the headquarters of an antivirus software company such as Symantec Corporation of Cupertino, Calif. for further analysis. The system administrator is usually notified when the suspicion of malicious computer code is verified. Once the presence of malicious computer code is verified, the target string containing the malicious computer code can be deleted or repaired.

FIG. 2 illustrates apparatus suitable for carrying out the present invention. State memory 21 contains values of parameters, registers, memories, and storage means. State memory 21 can be embodied in the form of any storage device or combination of storage devices. Each storage device can be a register, a variable, computer memory, or any computer-readable medium. The values contained within state memory 21 can be associated with just the current packet being analyzed, the current stream or string being analyzed, or all data within the computer system. A flag or register associated with state memory 21 can be used to indicate whether the stored values are packet-local, stream-or string-local, or global; or else this information might be implicit from the operating context. State memory 21 is coupled to comparison module 24 and to function execution module 25.

Composing module 22 performs step 11, composing a pattern matching expression. This can be done by any conventional means such as retrieving the pattern matching expression from a library of expressions. As stated above and as more fully described below, in some embodiments the pattern matching expression is one that can be represented by a deterministic finite state automaton or by a push-down automaton. In some embodiments, the expression is a regular expression (regex). Regex is published in several different places, in several different flavors. In regex:

"." is a wildcard.

"a+" means any number of a's.

"a*" means 0 or a or aa or aaa, etc.

"b{1,3}" means b or bb or bbb.

(abc|def) means abc or def.

[a-m 3-7] means anything within the range a-m or 3-7.

[^ a-m] means "not a through m".

These are all describable by a state machine.

Normally you can't go backwards within a regex; once you match, you cannot unmatch. With the present invention, however, you can go backwards by using the backup function described below.

Embedding module 23, which is coupled to composing module 22, performs step 12, embedding a function within the pattern matching expression to form a character matching string. Embedding module 23 can be a text editor or any other type of user interface or automated system.

Comparison module 24 performs step 13, comparing the character matching string against the target string. Function execution module 25 is coupled to comparison module 24, and executes the function embedded within the pattern matching expression.

All of the modules illustrated in FIG. 2 can be implemented in hardware, firmware, software, or any combination thereof. When implemented in software, the software can be one or more of a stand-alone computer program, an applet, a dynamically linked library, a statically linked library, or any other means for conveying instructions to a computer; and can reside on any type of non-transitory computer-readable storage medium or media, such as one or more of a hard disk, floppy disk, CD, DVD, etc.

An example of embedding 12 a function within a regular expression is as follows:

$ab<getoff(r0)>.*pig<getoff(r1)>$ $<sub(r1,r0)><[less\ than\ or=to](r1,10)>$

In the grammar illustrated herein, functions are enclosed in angled brackets; however, alternative encodings could be used instead.

The above is a character matching string that will determine whether the expression "ab" is within ten characters of the expression "pig". This matching string might be used within a corporation when corporate intelligence has indicated that an "ab" within ten characters of a "pig" indicates that someone is attempting to break into the corporation's computer system.

The values in state memory 21 can be shared by two or more expressions. For example:

$abc<inc(r0)>$ and $def<[greater\ than\ or=to](r0,10)><reportID(ID\#)>$

In the first expression, the value of register r0 is incremented when "abc" is matched. In the second expression, if "def" is matched and the value of register r0 is at least 10, the intrusion ID number is reported to the system administrator.

The present invention is thus a new language that enables customers as well as software publishers to embed functions directly into regular expressions and other pattern matching expressions. These embedded functions provide additional programmatic capabilities, allowing algorithmic processing of the packet/stream data being scanned. Consider the following expression which could be authored with the inventive language:

$abc[0-9]<checkpacketsize(10,20)>.*def$

This signature matches any sequence of bytes in a sequence such as a packet that begins with the characters "abc", followed by a decimal digit (0-9). If the signature matches this prefix, it then calls a function called "checkpacketsize" to verify that the current packet being scanned is between 10 and 20 bytes long. The checkpacketsize function, and other functions like it, provide domain-specific algorithmic functionality to the signature author and can be used virtually anywhere in the string for detection, optimization, and false-positive elimination purposes. If the packet meets these size requirements, the rest of the signature runs and searches the remainder of the packet for the characters "def". If the signature matches, an alert to the system administrator is generated. False positive mitigation procedures can also be performed at this time.

Note that the inclusion of the checkpacketsize function after the initial prefix of "abc" but before the CPU intensive ".*" optimizes the application of the signature and reduces CPU load. ".*" is an example of a matching primitive. "." is a wildcard that matches with anything, and "*" means "zero or more". In general, it is a good idea to position non-CPU-intensive functions earlier in the string than CPU-intensive functions, and to position non-CPU-intensive functions earlier in the string than matching primitives. Using non-CPU-intensive functions to quickly check for required criteria before performing slower byte-by-byte matches speeds up scanning and reduces false positives as well.

Here's another example of a character matching string (signature):

default.ida<seekpacketoffset(0)>GET<getpacketsize (r0)>< sub(r0,5)><seekpacketoffset(r0)≧HTTP

The above signature first attempts to locate the string "default.ida" somewhere in a packet or other target string. If it matches, the next function seekpacketoffset causes the comparison engine 24 to seek to the start of the packet (resetting the current scan pointer so scanning proceeds at the top of the packet). Then the signature attempts to match the text "GET" at the top of the packet. If this is matched, the signature gets the current packet's size (with the getpacketsize function) and stores it into a temporary register r0 (a storage area within state memory 21 that can be used to store transient or persistent values). The next function sub then subtracts five from the packet size in the register, seeks within the packet to the specified offset (5 bytes from the end of the packet), and attempts to match the substring HTTP.

As can be seen, the addition of both functions as well as working registers (r0-r100, for example) enables the creation of extremely descriptive signatures without a great deal of complexity. Users can intermingle both regular expression primitives as well as a host of functions within a signature to create signatures with low false positive rates, improved performance, and impressive detection capabilities. Signatures can seek around the packet/stream as required to search for data.

In general, the functions described herein can provide the following advantageous capabilities:

a. The ability to move around in the packet/stream to scan at arbitrary locations.

b. The ability to perform arbitrary mathematical calculations based on data found within the packet/stream.

c. The ability to fetch, decode, and evaluate binary-encoded values in binary data streams, and use this to enhance detection.

d. The ability to perform more complex algorithmic analysis of the packet/stream contents, such as histograms, entropy measurements, etc.

The use of a register-set by functions within a pattern matching expression, such as a regular expression, provides a great deal of detection power, since it enables data manipulation and therefore more complex detections, without the overhead of a full interpreted language/P-CODE system.

In one embodiment of the present invention, a function that matches without sensitivity to case is embedded within a pattern matching expression. Such a character matching string can be written as:

(default.ida){i}.*def

This string matches target strings default.ida, DeFaULT.iDa, etc.

Another example of a function that can be embedded within a pattern matching expression is a function that matches despite the presence of alternate encoding, such as unicode, double unicode, EBCDIC, and BCD. Unicode is an encoding mechanism used in Microsoft and Apache Web servers, and serves to encode byte values using hexadecimal notation. Unicode is represented by "%" followed by a hexadecimal representation. For example, "%41" represents "A" on typical ASCII-based computers.

Double unicode encoding is a Microsoft notation. An example of double unicode encoding is "%31". "%6" is normally invalid unicode, because there is only one digit following the "%". However, the Microsoft parser skips this invalid encoding and decodes the "%31", which decodes to a "1", yielding a resulting buffer of "%61". During a second pass, this newly constructed encoding yields an "a". Double unicode encoding is sometimes used to exploit IIS (Internet Information Server) vulnerabilities.

A function that matches despite the presence of unicode encoding can be written as:

(default.ida){u}.*def

The above string matches against default.ida, d%65fault.ida,

%64%65%66ault.ida, etc.

The following functions can be used as embedded functions within expressions pursuant to the principles of the present invention:

| Function Name | Parameter Details | Notes |
| --- | --- | --- |
| <forward(val_or_reg)> | register or value allowed | Seeks forward in the expression by the specified # of bytes. Fails if distance exceeds available packet/stream data. |
| <backup(val_or_reg)> | register or value allowed | Seeks backward in the expression by the specified # of bytes. Fails if seek moves before cached/packet data. |
| <getpacketsize(dest_reg)> | register only | Gets size of current packet where scan pointer is positioned and stores in specified storage means. |
| <gethitoffset(type,dest_reg)> | type is _PACKET or _STREAM | Gets either the packet or stream offset where the first byte of the signature matched. |
| <getcuroffset(type,dest_reg)> | type is _PACKET or _STREAM | Gets either the packet or stream offset of the current scan pointer. |
| <getbuffersize(dest_reg)> | register only | Gets the size of the current cached data + the current packet being processed and stores in specified register. |

-continued

| Function Name | Parameter Details | Notes |
|---|---|---|
| <seekoffset(type,val_or_reg)> | type is _PACKET or _STREAM | Seeks to specified absolute offset in packet-relative or stream-relative terms. Fails if offset falls outside of cached data and packet data. |
| <getbyte(dest_reg)> | register only | Gets byte at current scan pointer from packet/cache and stores into specified register. |
| <getBEword(dest_reg)><br><getLEword(dest_reg)> | register only | Gets Big-Endian or Little-Endian WORD at current scan pointer from packet/cache and stores into specified storage means. |
| <getBEdword(dest_reg)><br><getLEdword(dest_reg)> | register only | Gets Big-Endian or Little-Endian DWORD at current scan pointer from packet/cache and stores into a specified storage means. |
| <inrange(reg,val1,val2)><br><inrange(reg,reg1,reg2)> |  | Determines if the value in the first parameter (reg) is >=val1 and <=val2 (same for register version). If this is false, then the function fails and this is treated as a mismatch. If this succeeds, then the signature continues. |
| <getSRCport(dest_reg)><br><getDSTport(dest_reg)> | register only | Gets source or destination port and stores in specified register. |
| <mov(dest_reg,val_or_reg)> | first parameter must be a register | Stores second parameter into destination register. |
| <add(dest_reg,src_reg)><br><sub(dest_reg,src_reg)><br><mul(dest_reg,src_reg)><br><div(dest_reg,src_reg)><br><and(dest_reg,src_reg)><br><or(dest_reg,src_reg)><br><xor(dest_reg,src_reg)> | both parameters must be registers | Performs specified operation, storing result in dest_reg. |
| <dec(dest_reg)><br><inc(dest_reg)> | register only | Increments or decrements specified register. |
| <eg(reg,reg)> | registers only | Compares two numbers. If they are different, the function fails and this is treated as a signature mismatch. If they are the same, the signature continues. |
| <hist(byte_val,len_reg,dest_reg) | 0x00 <=byte val <=0xff len_reg specifies the number of bytes to check for the histogram dest_reg gets count | Counts the number of occurrences of the specified byte_val in the region between the current scan pointer and the current scan pointer + len_reg. Stores count into dest_reg. |
| <reportid(val_or_reg)> |  | Reports to the system administrator an incident ID number, e.g., an intrusion number. |
| <test(reg1,reg2)> | all registers | temp = reg1 temp &= reg2<br>if(temp != reg2) treat as mismatch<br>else continue sig. application |
| (testz(reg1,reg2)> |  | temp = reg1 temp &= reg2<br>if (temp != 0) treat as mismatch<br>else continue sig. application |
| <strtol(base,dest_reg1,dest_eg2)> | base is _DECIMAL or _HEX, dest_reg1 gets the decoded value, dest_reg2 gets status | This function attempts to do a string to integer conversion at the current scan pointer within the cache or packet data. This will convert the characters in byte stream into an integer and store the value into dest_reg1. If the conversion is successful, dest_reg2 is set to 1, else it is set to 0. Useful after matching "Content-length:" type fields.<br>Example:<br>(content-length:){i}[^0-9]*<br><strtol(_DECIMAL,r0,r1)>... |
| <stop> | no parameters | Mimics a mismatch in the current regex evaluation. Does not necessarily terminate current regex evaluation. |
| <pcode(id_value)> | parameter must be value | The function calls byte code (such as P-CODE) or machine code. For example, the function calls a P-CODE engine to run module number id_value. If P-CODE module returns success, then regular expression evaluation continues. If failure is returned, this is treated as a mismatch. |
| <extend(register)> | parameter must be a register | Extends the maximum size of the current stream to be scanned by the register's value. Use this if you see something suspicious and want to scan through more of the stream than usual. |

-continued

| Function Name | Parameter Details | Notes |
|---|---|---|
| <exclude(register)> | parameter must be a register, specifies an offset | Excludes scanning of the current stream until the specified stream-relative offset is reached. Useful to skip scanning of innocuous encoded file data in HTTP transfers, for example. |
| <needmore> | no parameter | Instructs engine that the signature cannot properly be matched without subsequent packet data. Treated as a mismatch in the current signature. The signature will be re-applied once more packet data is available. |
| <gettime(dest_reg)> | parameter must be register | Gets the number of elapsed seconds since 1980 (time zero for certain computers). Value stored in register. |
| <getheaderparam(field,dest_reg, error_reg)> | field: see constants in regexshr.h other programs must be registers | Retrieve the header parameter specified by "field". Dest_reg contains the value (in host-byte order) and error_reg contains any errors (see regexshr.h). The function will make its best effort to retrieve a value despite any errors occurring–>always check the error reg before trusting results. |

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for composing a character matching string for use in detecting malicious computer code within a computer system, said method comprising the steps of:
   using a computer to perform steps comprising:
      composing a pattern matching expression formed of a symbol string, wherein the pattern matching expression is representable by a deterministic finite state automaton having only a single state at each point in time;
      embedding a function within the symbol string of the pattern matching expression to form the character matching string, wherein the function is described by a second symbol string bounded by designated symbols, the function accesses state memory storing values used by the function to perform algorithmic processing of a target string, the function expands the pattern matching expression into an expanded pattern matching expression not representable by a deterministic finite state automaton, and the function provides one or more abilities from the set of abilities consisting of: a) moving around a packet or stream to scan at arbitrary locations, b) performing arbitrary mathematical calculations based on data found within the packet or stream, c) fetching, decoding, and/or evaluating binary-encoded values in the stream, and d) performing algorithmic analysis of the packet or stream; and
      providing the character matching string to the computer system, wherein the computer system is adapted to use the expanded pattern matching expression and execute the function to compare the character matching string against the target string and declare a suspicion that the target string contains malicious computer code responsive to a match.

2. A computer-implemented method for composing a character matching string for use in detecting malicious computer code within a computer system, said method comprising the steps of:
   using a computer to perform steps comprising:
      composing a pattern matching expression formed of a symbol string, wherein the pattern matching expression is representable by a push-down automaton, wherein the push-down automaton is a state machine that uses a stack to push data onto the stack or to pop data off of the stack;
      embedding a function within the symbol string of the pattern matching expression to form the character matching string, wherein the function is described by a second symbol string bounded by designated symbols, the function accesses state memory storing values used by the function to perform algorithmic processing of a target string, the function expands the pattern matching expression into an expanded pattern matching expression not representable by a push-down automaton, and the function provides one or more abilities from the set of abilities consisting of: a) moving around a packet or stream to scan at arbitrary locations, b) performing arbitrary mathematical calculations based on data found within the packet or stream, c) fetching, decoding, and/or evaluating binary-encoded values in the stream, and d) performing algorithmic analysis of the packet or stream; and
      providing the character matching string to the computer system, wherein the computer system is adapted to use the expanded pattern matching expression and execute the function to compare the character matching string against the target string and declare a suspicion that the target string contains malicious computer code responsive to a match.

3. The method of any of claim 1 or 2, wherein the pattern matching expression is a regular expression.

4. The method of any of claim 1 or 2, wherein:
   non-CPU-intensive functions are positioned earlier in the character matching string than CPU-intensive functions or matching primitives.

5. A non-transitory computer-readable storage medium containing executable computer program instructions for composing a character matching string for use in detecting malicious computer code within a computer system, said computer program instructions performing the steps of:

composing a pattern matching expression formed of a symbol string, wherein the pattern matching expression is representable by a deterministic finite state automaton having only a single state at each point in time;

embedding a function within the symbol string of the pattern matching expression to form the character matching string, wherein the function is described by a second symbol string bounded by designated symbols, the function accesses state memory storing values used by the function to perform algorithmic processing of a target string, the function expands the pattern matching expression into an expanded pattern matching expression not representable by a deterministic finite state automaton, and the function provides one or more abilities from the set of abilities consisting of: a) moving around a packet or stream to scan at arbitrary locations, b) performing arbitrary mathematical calculations based on data found within the packet or stream, c) fetching, decoding, and/or evaluating binary-encoded values in the stream, and d) performing algorithmic analysis of the packet or stream; and providing the character matching string to the computer system, wherein the computer system is adapted to use the expanded pattern matching expression and execute the function to compare the character matching string against the target string and declare a suspicion that the target string contains malicious computer code responsive to a match.

6. A non-transitory computer-readable storage medium containing executable computer program instructions for composing a character matching string for use in detecting malicious computer code within a computer system, said computer program instructions performing the steps of:

composing a pattern matching expression formed of a symbol string, wherein the pattern matching expression is representable by a push-down automaton, wherein the push-down automaton is a state machine that uses a stack to push data onto the stack or to pop data off of the stack;

embedding a function within the symbol string of the pattern matching expression to form the character matching string, wherein the function is described by a second symbol string bounded by designated symbols, the function accesses state memory storing values used by the function to perform algorithmic processing of a target string, the function expands the pattern matching expression into an expanded pattern matching expression not representable by a push-down automaton, and the function provides one or more abilities from the set of abilities consisting of: a) moving around a packet or stream to scan at arbitrary locations, b) performing arbitrary mathematical calculations based on data found within the packet or stream, c) fetching, decoding, and/or evaluating binary-encoded values in the stream, and d) performing algorithmic analysis of the packet or stream; and providing the character matching string to the computer system, wherein the computer system is adapted to use the expanded pattern matching expression and execute the function to compare the character matching string against the target string and declare a suspicion that the target string contains malicious computer code responsive to a match.

7. The non-transitory computer-readable storage medium of claim 5 wherein the function seeks forward in the pattern matching expression by a specified number of bytes.

8. The non-transitory computer-readable storage medium of claim 5 wherein the function seeks backward in the pattern matching expression by a specified number of bytes.

9. The non-transitory computer-readable storage medium of claim 5 wherein the function gets a size of a current packet where a scan pointer is positioned, and stores said size in a specified storage means.

10. The non-transitory computer-readable storage medium of claim 5 wherein the function gets a packet or stream offset of a current scan pointer.

11. The non-transitory computer-readable storage medium of claim 5 wherein the function seeks to a specified absolute offset in packet-relative or stream-relative terms.

12. The non-transitory computer-readable storage medium of claim 5 wherein the function gets a Big-Endian or a Little-Endian word at a current scan pointer from a packet or cache, and the function stores the word into a specified storage means.

13. The non-transitory computer-readable storage medium of claim 5 wherein the function is an arithmetic function.

14. The non-transitory computer-readable storage medium of claim 5 wherein the function calls byte code or machine code.

15. The non-transitory computer-readable storage medium of claim 6, wherein the function seeks forward in the pattern matching expression by a specified number of bytes.

16. The non-transitory computer-readable storage medium of claim 6, wherein the function seeks backward in the pattern matching expression by a specified number of bytes.

17. The non-transitory computer-readable storage medium of claim 6, wherein the function gets a size of a current packet where a scan pointer is positioned, and the function stores said size in a specified storage means.

18. The non-transitory computer-readable storage medium of claim 6, wherein the function gets a packet or stream offset of a current scan pointer.

19. The non-transitory computer-readable storage medium of claim 6, wherein the function seeks to a specified absolute offset in packet-relative or stream-relative terms.

* * * * *

UNITED STATES PATENT AND TRADEMARK OFFICE
CERTIFICATE OF CORRECTION

| | | |
|---|---|---|
| PATENT NO. | : 7,861,304 B1 | |
| APPLICATION NO. | : 10/841376 | |
| DATED | : December 28, 2010 | |
| INVENTOR(S) | : Carey S. Nachenberg et al. | |

It is certified that error appears in the above-identified patent and that said Letters Patent is hereby corrected as shown below:

IN THE CLAIMS:

Claim 3, column 10, line 57, after "The method of any of" delete "claim" and insert --claims--.

Claim 4, column 10, line 59, after "The method of any of" delete "claim" and insert --claims--.

Signed and Sealed this
Twenty-second Day of March, 2011

David J. Kappos
*Director of the United States Patent and Trademark Office*